UNITED STATES PATENT OFFICE.

GEORGE MATTHEWS, OF NEW YORK, N. Y., ASSIGNOR TO HIMSELF AND JOHN H. MATTHEWS, OF SAME PLACE.

APPARATUS FOR DISPENSING LIQUIDS.

SPECIFICATION forming part of Letters Patent No. 634,695, dated October 10, 1899.

Application filed March 29, 1899. Serial No. 710,974. (No model.)

*To all whom it may concern:*

Be it known that I, GEORGE MATTHEWS, a citizen of the United States, residing in New York city, borough of Manhattan, State of New York, have invented certain new and useful Improvements in Apparatus for Dispensing Liquids, of which the following is a specification.

My invention relates to improvements in the class of liquid-dispensing apparatuses in which aerated liquid is drawn from a receptacle or reservoir into a vessel or chamber in which the free gas or pressure is let off or relieved before the liquid is drawn for consumption; and the invention consists in the novel details of improvement and the combinations of parts, that will be more fully hereinafter set forth and then pointed out in the claims.

Reference is to be had to the accompanying drawings, forming part hereof, wherein—

Figure 1 is a central section of an apparatus embodying my invention. Fig. 2 is a horizontal section on the plane of the line 2 2 in Fig. 1. Fig. 3 is a section on the line 3 3 in Fig. 2, and Fig. 4 is an enlarged sectional view of a modified form of the valves and ports that control the passage of liquid and gas to and from the receiving or intermediate chamber.

Similar numerals of reference indicate corresponding parts in the several views.

1 indicates a pipe or tube to be connected with an aerated-liquid receptacle or reservoir, which pipe communicates with a chamber 2, that is connected with a liquid-receiving vessel 3. The chamber 2, in addition to the inlet from pipe 1 and the outlet into vessel 3, has a port or outlet 4 for the escape of gas that becomes free or liberated from the liquid entering vessel 3.

5 is a suitably-arranged plunger to reciprocate within chamber 2 and acting to close and open the inlet and outlet ports 1 4. In Fig. 1 the plunger 5 is shown composed of a stem $5^a$, having a head $5^b$, which carries a valve or washer 6 to act upon seat $1^a$ of the inlet-port, and a threaded portion $5^c$, that is screwed into a block $5^d$, that carries a valve or washer 7, which is adapted to bear against the seat $4^a$ of outlet-port 4. 8 is a spring surrounding the plunger and bearing at one end against head $5^b$ and at the other end against a washer or abutment 9, the tendency of which spring is to keep the valve closed against seat $1^a$. From this it will be seen that when the valve 6 closes inlet-port $1^a$ the outlet-port 4 is open, and when said valve is removed from its seat the valve or washer 7 will close outlet-port 4; but both ports are not closed at the same time. I have shown pipe 1 inclosed within an exterior pipe 10, the head or end $10^b$ of which is connected by screw-threads with chamber 2, packing 11 being interposed between parts $10^b$ and 2. The bore of pipe 10 communicates through a port $10^a$ in the head $10^b$ with port 4, and the head $10^b$ has a port $10^c$, that communicates with pipe 1 and with a port $2^a$ in chamber 2, the latter and head $10^b$ also having bores to receive the plunger 5, the washer 11 also having holes alined with said bores and with the ports $10^a$, $10^c$, 4, and $2^a$.

The vessel 3 has an inlet-neck $3^a$, (shown provided with a flange $3^b$,) adapted to enter a bore $2^b$ of chamber 2 and supported by a nut or the like 12, threaded in said bore $2^b$. By preference the nut 12 is connected with or a continuation of a shell or frame 13, that is adapted to inclose vessel 3 to protect the same when the latter is made of glass. The vessel 3 has an outlet-opening $3^c$, and the protecting-shell 13 has a corresponding opening $13^a$ alined therewith. The inner edge $3^d$ of the outlet $3^c$ serves as a seat for a valve or washer 14. The latter is shown carried by a plunger 15, located within vessel 3. The plunger 15 is shown composed of a head $15^a$, (that carries valve or washer 14,) a stem $15^b$, that passes upwardly through vessel 3 and its neck $3^a$, and a head or yoke $15^c$, attached to stem $15^b$, as by screw-threads, and located in chamber 2. The plunger 15 passes through a tube 16, in which head $15^a$ is guided, and tube 16 depends from neck $3^a$ into vessel 3. In the upper end of tube 16 is a plug 17, having a guiding-bore for the passage of stem $15^b$ and one or more apertures or grooves $17^a$ for the passage of liquid from chamber 2 to vessel 3, the tube 16 near its upper part having one or more outlet-openings $16^a$, communicating with vessel 3. The tube 16 may be suitably secured to plug 17, and the latter is shown provided with an annular flange 17ʰ, which overlies the neck of vessel 3 and is adapted to make a fluid-tight joint with a seat 2ᶜ at the upper end of bore 2ᵇ of chamber 2, packing 18 being interposed between 17ʰ and 2ᶜ and packing 19 between 17ʰ and 3ᵇ. When the parts are assembled as shown in Fig. 1, it will be seen that the nut 12 supports flanges 3ᵇ and 17ᵇ, whereby the parts 3, 13, 16, and 17 are sustained and fluid-tight joints made.

20 is a coiled spring located within tube 16 and bearing at one end against head 15ᵃ and at its other end against plug 17, thus tending to keep valve 14 normally against its seat 3ᵈ.

It will be seen that the device has three valves 6, 7, and 14, and the means I have shown for operating said valves are as follows: 21 is a shaft journaled in bearings in chamber 2 and extending transversely of the latter, and to this shaft is connected a valve-operating arm 22, that projects from opposite sides of the shaft. The arm 22 has a projection or nose 22ᵃ, that engages a shoulder 5ᵉ on part 5ᵈ of plunger 5, and a projection 22ᵇ, that enters a recess or slot 15ᵈ in head 15ᶜ of valve or plunger 15, the depth of the slot 15ᵈ below its cross-bar 15ᵉ being such that arm 22ᵇ can have independent movement. The relation of the parts is such that when shaft 21 is rotated in one direction, as in the direction of the arrow in Fig. 1, its projection 22ᵃ will raise plunger 5, thereby unseating valve 6 and allowing aerated liquid to enter chamber 2, from whence it passes to vessel 3, and will thereupon close valve 7 against outlet-seat 4ᵃ, while valve 14 remains seated. When shaft 21 is next rotated in the opposite direction, its projection 22ᵃ will allow valve 7 to be unseated, and valve 6 will engage its seat 1ᵃ, whereupon the free or liberated gas from the liquid in vessel 3 will pass through the outlet-port 4 and pipe 10, the latter being shown provided with an outlet 10ᵈ for the escape of the gas. A further rotation of shaft 21 causes arm 22ᵇ to act upon cross-bar 15ᵉ of head 15ᶜ after valve 6 is seated to move valve 14 from its seat, whereupon the liquid from vessel 3 can pass into a receptacle held beneath the same. From what has been explained it will be seen that the position of arm 22ᵇ relatively to cross-bar 15ᵉ is such as to assure that valve 6 will reach its seat before valve 14 can be raised, and this is accomplished by having a space between 22ᵇ and 15ᵉ when in their normal positions. The liquid-inlet valve and the gas-outlet valve are operated simultaneously, but entirely independently of the outlet-valve of vessel 3.

To further assure that valve 6 will be fully seated before valve 14 can be unseated, I provide a handle 23 for shaft 21, that is adapted to rotate said shaft, but also has independent movement on the same, for which purpose handle 23 is swiveled on said shaft and has a chamber 24, provided with stops or shoulders 24ᵃ 24ᵇ at a suitable distance apart, and upon shaft 21 within chamber 24 is a projection 25, adapted to engage said shoulders, but of less width than the distance between said shoulders. The walls of chamber 24 may be screw-threaded to receive a locking washer or nut 26 to keep the handle upon shaft 21. (See Fig. 2.) The arrangement is such that when the handle is turned in the direction of the arrow in Fig. 1 to unseat valve 6 and to seat valve 7 shoulder 24ᵃ will first engage projection 25 of shaft 21, and when shaft 21 is turned in the reverse direction handle 23 will rotate freely on the same a certain distance before shoulder 24ᵇ engages projection 25, during which rotation valve 6 will find its seat, and thereafter during a continued rotation of handle 23 the projection 22ᵇ will engage cross-bar 15ᵉ to unseat valve 14.

In the modification shown in Fig. 4 the position of valves 6 and 7 is reversed—that is to say, the inlet-valve 6 is at the upper part of plunger 5 and the gas-outlet valve 7 is at the lower part thereof, and the port 1ᵇ, communicating with pipe 1, leads to the chamber above valve 6, so that the normal pressure of the aerated liquid will act upon the valve to assist in closing the same in addition to the action of spring 8, whereas in Fig. 1 the pressure of the aerated liquid is against valve 6, tending to open it. The plunger 5 is shown provided with grooves 5ᶠ to communicate with port 1ᵇ and chamber 2 and with other grooves 5ᵍ to communicate with port 4, a hollow cap 4ᵇ, that receives valve 7, forming a chamber for the outlet of the gas. The port 4 leads to a groove 4ᶜ in the material of chamber 2, and that groove communicates with a groove 10ᵉ in head 10ᵇ of pipe 10, from which one or more bores 10ᵃ lead to the bore in said pipe. The action of the parts, however, is similar to that in Fig. 1—that is to say, when valve 6 is unseated by the action of projection 22ᵃ valve 7 will be seated, and when valve 6 is seated by its spring 8 valve 7 will be unseated, and thereafter the pressure of the aerated liquid will act upon valve 6 to keep it to its seat.

I do not limit my invention to the precise details of construction shown and described, as they may be varied without departing from the spirit thereof.

Having now described my invention, what I claim is—

1. In an apparatus for dispensing or drawing off aerated liquids, the combination of a liquid-receiving vessel for communication with a liquid-reservoir, inlet, outlet and vent ports for said vessel, and a pair of self-acting valves united together one of which normally closes the inlet and the other normally keeps the vent port open, said valves and ports being so correlated that after the inlet-port is opened the vent-port will be closed, substantially as described.

2. In an apparatus for dispensing or drawing off aerated liquid the combination of a liquid-receiving vessel for communication with a liquid-reservoir, inlet, outlet and vent ports for the same, valves to close said ports, the valves of the inlet and outlet ports both being normally held closed and the valve of the vent-port being normally open, and means for operating said valves arranged so as to first open the inlet-port and thereafter close the vent-port and to open the outlet-port after the inlet-port is again closed and the vent-port again opened, substantially as described.

3. In an apparatus for dispensing or drawing off aerated liquids the combination of a liquid-receiving vessel for communication with a liquid-reservoir, inlet, outlet and vent ports for said vessel, valves to alternately open and close the inlet and vent ports, a valve to close the outlet-port, and means for operating said valves to first open the inlet-port and then close the vent-port when moving in one direction and to open the vent-port, next close the inlet-port and then open the outlet-port when moving in the opposite direction, substantially as described.

4. In an apparatus for dispensing or drawing off aerated liquids the combination of a liquid-receiving vessel for communication with a liquid-reservoir, inlet, outlet and vent ports for said vessel, valves to alternately open and close the inlet and vent ports, a normally-closed valve to control the outlet-port, and a rocker-arm arranged to open the inlet-port and close the vent-port when moved in one direction without operating the outlet-valve and to open the vent-port, close the inlet-port and open the outlet-port when moving in the opposite direction, substantially as described.

5. In an apparatus for dispensing or drawing off aerated liquids the combination of a liquid-receiving vessel for communication with a liquid-reservoir, inlet, outlet and vent ports for said vessel, valves to alternately open and close the inlet and vent ports, a normally-closed valve to control the outlet-port, and means to actuate said inlet and vent valves simultaneously and the outlet-valve independently, part of which means has movement independent of the inlet and vent valves for a distance to assure the seating of the inlet-valve and the unseating of the vent-valve before the unseating of the outlet-valve, substantially as described.

6. In an apparatus for dispensing or drawing off aerated liquids, the combination of a liquid-receiving vessel for communication with a liquid-reservoir, inlet, outlet and vent ports for said vessel, valves to alternately open and close the inlet and vent ports, a valve to close the outlet-port, a shaft having means for operating said valves, a handle movably connected with said shaft, and means connecting said shaft and handle so that the handle can have movement independently of the shaft for a distance before moving the shaft with it, substantially as described.

7. In an apparatus for dispensing or drawing off aerated liquids, the combination of a liquid-receiving vessel for communication with a liquid-reservoir, inlet, outlet and vent ports for said vessel, valves to alternately open and close the inlet and vent ports, a valve to close the outlet-port, a shaft having means for operating said valves, a handle movably connected with said shaft and having a chamber provided with opposed projections, and a projection on said shaft of less width than the distance between said projections of the handle, whereby the handle can have independent movement on the shaft before rotating the latter, substantially as described.

8. In an apparatus of the character described the combination of a chamber for communication with a liquid-reservoir and having inlet and vent ports, valves to control said ports, the inlet-valve being normally closed and the vent-valve normally open, a receiving vessel in permanent communication with said chamber, a normally-closed valve to control the outlet thereof, and means for simultaneously operating the inlet and vent valves to hold the vent-valve closed after the inlet-valve is opened and for independently operating the outlet-valve, substantially as described.

9. In an apparatus of the character described a chamber for communication with a liquid-reservoir and having inlet and vent ports, valves to control said ports, a liquid-receiving vessel connected with said chamber and having an outlet, a plunger extending from said outlet into said chamber, and means in said chamber for operating said valves and plunger, substantially as described.

10. In an apparatus of the character described a chamber for communication with a liquid-reservoir and having inlet and vent ports, valves for said ports, a liquid-receiving vessel connected with said chamber, a tube in said vessel, a plunger located in said tube and extending into said chamber for controlling the outlet of said vessel, and means for operating said valves and plunger, substantially as described.

11. In an apparatus of the character described the combination of a chamber for communication with a liquid-reservoir and having inlet and vent ports, valves to control said ports, a liquid-receiving vessel connected with said chamber, a tube in said vessel, a plug in said tube, means to permit the passage of liquid from said chamber to said vessel, a plunger guided in said tube and plug to control the outlet of said vessel, and means for operating said valves and plunger, substantially as described.

12. In an apparatus of the character described the combination of a chamber for communication with a liquid-reservoir and having inlet and vent ports, valves to control said ports, a liquid-receiving vessel having a neck provided with a flange, a plug connected with said vessel and having a flange, means for connecting said flanges with said chamber, a plunger in said vessel for controlling the outlet thereof and guided by said plug, and means for operating said valves and plunger, substantially as described.

13. In an apparatus of the character described the combination of a chamber for communication with a liquid-reservoir and having inlet and vent ports, valves to control said ports, a liquid-receiving vessel having a neck provided with a flange, a plug connected with said vessel and having a flange, a tube depending into said vessel from said plug, means for holding said flanges to said chamber, a plunger guided in said tube and plug for controlling the outlet of said vessel, and means for operating said valves and plunger, substantially as described.

14. In an apparatus of the character described the combination of a chamber for communication with a liquid-reservoir and having inlet and vent ports, valves to control said ports, a liquid-receiving vessel having a neck provided with a flange, a plug connected with said vessel and having a flange, said plug having a liquid-passage and a bore, a tube depending from said plug, a plunger guided by said tube and plug to control the outlet from said vessel, and a nut or the like to hold said flanges in connection with said chamber, substantially as described.

15. In an apparatus of the character described the combination of a chamber for communication with a liquid-reservoir and having inlet and vent ports, valves to control said ports, said chamber having a bore $2^b$, a liquid-receiving vessel having a neck provided with a flange to enter said bore, and a frame to inclose said vessel provided with means for connecting it with said chamber and for holding said flange in connection therewith, a plunger to control the outlet from said vessel, and means for operating said valves and plunger, substantially as described.

16. In an apparatus of the character described the combination of a chamber for communication with a liquid-reservoir and having inlet and vent ports alined and spaced apart, a plunger carrying valves that are at a different distance apart than the distance between said ports whereby when one port is closed the other will be open, and means for operating said plunger, substantially as described.

17. In an apparatus of the character described the combination of a chamber for communication with a liquid-reservoir and having alined inlet and vent ports, valves to control said ports, but spaced farther apart than the ports, the inlet-port having a chamber beyond its seat in communication with the liquid-reservoir, whereby the liquid will act to press the valve against its seat, and means for operating said valves, substantially as described.

18. In an apparatus of the character described the combination of a chamber for communication with a liquid-reservoir and having alined inlet and vent ports, a plunger carrying valves to control said ports alternately but spaced farther apart than the distance between said ports, the inlet-valve being located in a chamber that extends beyond its seat and which is in communication with the inlet whereby the liquid will tend to force the valve to its seat, and means for operating said valves, substantially as described.

GEORGE MATTHEWS.

Witnesses:
T. F. BOURNE,
F. E. TURNER.